US010867492B1

(12) United States Patent
Lev

(10) Patent No.: US 10,867,492 B1
(45) Date of Patent: Dec. 15, 2020

(54) SYSTEMS AND METHODS FOR DISCREET IMAGING OF A SCENE

(71) Applicant: NEC Corporation Of America, Herzlia (IL)

(72) Inventor: Tsvi Lev, Tel-Aviv (IL)

(73) Assignee: NEC Corporation Of America, Herzlia (IL)

( * ) Notice: Subject to any disclaimer, the term of this patent is extended or adjusted under 35 U.S.C. 154(b) by 0 days.

(21) Appl. No.: 16/521,612

(22) Filed: Jul. 25, 2019

(51) Int. Cl.
*G08B 13/196* (2006.01)
*G06K 9/00* (2006.01)

(52) U.S. Cl.
CPC ... *G08B 13/19626* (2013.01); *G06K 9/00288* (2013.01); *G06K 9/00369* (2013.01); *G06K 9/00771* (2013.01); *G08B 13/19641* (2013.01); *G08B 13/19686* (2013.01)

(58) Field of Classification Search
CPC ................................................ G08B 13/19626
See application file for complete search history.

(56) References Cited

U.S. PATENT DOCUMENTS

| | | | | |
|---|---|---|---|---|
| 9,324,745 | B2* | 4/2016 | Yazici | H04N 5/378 |
| 10,126,826 | B2* | 11/2018 | Katz | G06F 3/017 |
| 10,338,162 | B2* | 7/2019 | Reynolds | G01R 33/26 |
| 10,345,396 | B2* | 7/2019 | Manickam | G01R 33/032 |
| 10,677,953 | B2* | 6/2020 | Stetson | G01V 3/101 |
| 2008/0296500 | A1* | 12/2008 | Ramboyong | G02B 23/12 250/332 |
| 2011/0173574 | A1* | 7/2011 | Clavin | G06F 3/017 715/863 |
| 2012/0037803 | A1* | 2/2012 | Strickland | H01Q 1/425 250/338.1 |
| 2013/0278716 | A1* | 10/2013 | Kennedy | G01S 7/4802 348/42 |
| 2014/0296112 | A1* | 10/2014 | O'Driscoll | G01J 3/0208 506/39 |
| 2015/0319391 | A1* | 11/2015 | Yazici | H04N 5/33 348/300 |
| 2016/0227099 | A1* | 8/2016 | Hansen | H04N 5/23209 |
| 2019/0277753 | A1* | 9/2019 | Waxman | G01J 3/021 |

\* cited by examiner

*Primary Examiner* — Irfan Habib

(57) ABSTRACT

An apparatus for discreet imaging of a scene, comprising: at least one short wave infrared (SWIR) sensor that captures at least one SWIR image of the scene at a SWIR wavelength range, at least one SWIR illumination element that generates SWIR illumination at the SWIR wavelength range, and a barrier positioned such that SWIR illumination reflecting off objects of scene within the field of view passes through the barrier to reach the at least one SWIR sensor, the barrier made out of a material and having a thickness selected for being opaque to visible light and non-opaque to the SWIR wavelength range.

17 Claims, 10 Drawing Sheets

← 502

← 504

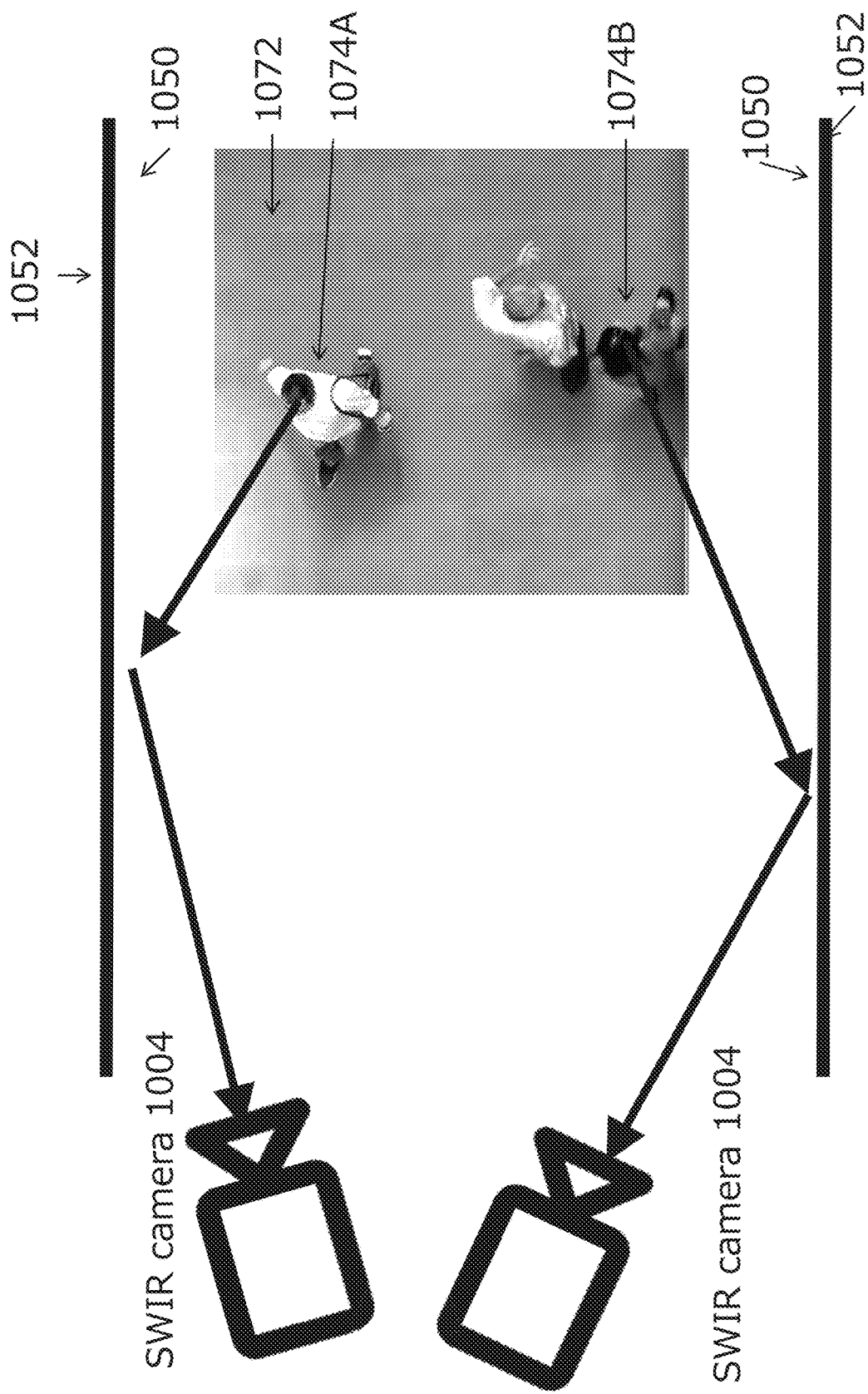

SYSTEMS AND METHODS FOR DISCREET IMAGING OF A SCENE

FIELD AND BACKGROUND OF THE PRESENT INVENTION

The present invention, in some embodiments thereof, relates to camera sensors and, more particularly, but not exclusively, to systems and methods for discreet imaging of a scene.

Cameras are increasingly becoming more popular for monitoring, for example, for biometric applications such as authentication and person recognition. In many use cases (e.g., legitimate and/or legal) discreet imaging of a scene is desired, since the visibility of the camera inhibits the use thereof and/or creates public discomfort.

SUMMARY OF THE PRESENT INVENTION

According to a first aspect, an apparatus for discreet imaging of a scene, comprises: at least one short wave infrared (SWIR) sensor that captures at least one SWIR image of the scene at a SWIR wavelength range, at least one SWIR illumination element that generates SWIR illumination at the SWIR wavelength range, and a barrier positioned such that SWIR illumination reflecting off objects of scene within the field of view passes through the barrier to reach the at least one SWIR sensor, the barrier made out of a material and having a thickness selected for being opaque to visible light and non-opaque to the SWIR wavelength range.

According to a second aspect, a method for discreet imaging of a scene, comprises: generating a SWIR illumination of a SWIR wavelength range towards the scene, receiving the SWIR illumination reflected off at least one object of the scene after the reflected SWIR illumination has passed through a barrier opaque to visible light, and providing a SWIR image generated from the received reflected SWIR illumination that has passed though the barrier.

In a further implementation form of the first and second aspects, the barrier is positioned within an entire field of view of the at least one SWIR sensor.

In a further implementation form of the first and second aspects, the barrier is positioned in proximity to a reflective surface of a mirror that reflects the SWIR illumination.

In a further implementation form of the first and second aspects, the barrier is selected from the group consisting of: paint applied to reflective surface, infrared dye applied to the reflective surface, and plastic positioned on or in proximity to the reflective surface.

In a further implementation form of the first and second aspects, further comprising code instructions stored on a memory that when executed by at least one hardware processor cause the hardware processor to analyze the at least one SWIR image to identify faces of people depicted in the SWIR image as a reflection off a display, and output an identity of a face of a person depicted in the at least one SWIR image according to the analysis.

In a further implementation form of the first and second aspects, further comprising code instructions stored on a memory that when executed by at least one hardware processor cause the hardware processor to analyze the at least one SWIR image to detect an indication of a mask, and provide the indication of the mask.

In a further implementation form of the first and second aspects, the analysis to detect an indication of the mask comprising detecting a statistical similarity in pixel intensity values between the at least one SWIR image at about 1000 nm and at about 1500-1550 nm.

In a further implementation form of the first and second aspects, the at least one SWIR sensor captures the at least one SWIR image at a quality level above a threshold and a visible light sensor substituted for the at least one SWIR sensor captures at least one visible light image using visible light at a quality level below the threshold.

In a further implementation form of the first and second aspects, the quality level denotes at least one member of the group consisting of: a signal to noise ratio, and an accuracy of automatically identifying a feature depicted in the at least one SWIR image, the feature selected from the group consisting of: a face, a person, a pose, a gesture, and a measurement of a body of a person.

In a further implementation form of the first and second aspects, the at least one SWIR sensor captures the at least one SWIR image at a quality level below a threshold, and a visible light sensor positioned to capture at least one visible light image using visible light prior to passing through the barrier captures the at least one visible light images at a quality level above the threshold.

In a further implementation form of the first and second aspects, the material and thickness of the barrier are selected such that the quality level of the at least one SWIR image captured by the SWIR sensor is within a tolerance range of the quality level of the at least one visible light image captured by the visible light sensor using visible light non-passing through the barrier.

In a further implementation form of the first and second aspects, the tolerance range denotes a statistical similar accuracy in correct identification of a feature depicted in the at least SWIR image captured by the SWIR sensor and the at least one visible light image captured by the visible light sensor, the feature selected from the group consisting of: a face, a person, a pose, a gesture, and a measurement of a body of a person.

In a further implementation form of the first and second aspects, further comprising at least one hardware processor for executing a code stored on a memory, the code for receiving the at least one SWIR image, and analyzing the at least one SWIR image to recognize at least one feature depicted within the respective SWIR image, the feature selected from the group consisting of: a face, a person, a pose, a gesture, and a measurement of a body of a person.

In a further implementation form of the first and second aspects, when the at least one hardware processor executing a code fails to recognize the at least one feature depicting within at least one visible light image captured by the visible light sensor substituted for the at least one SWIR sensor, the feature selected from the group consisting of: a face, a person, a pose, a gesture, and a measurement of a body of a person.

In a further implementation form of the first and second aspects, the at least one SWIR illumination element is positioned behind the barrier such that the SWIR illumination generated by the SWIR illumination element passes through the barrier before reflection of the objects.

In a further implementation form of the first and second aspects, the field of view depicted within the at least one SWIR image is wider than a field of view of a visible light image captured by the visible light sensor through a pinhole.

In a further implementation form of the first and second aspects, the at least one SWIR sensor, the at least one SWIR illumination element, and the barrier are stored within a household item, the barrier formed as a continuation of an outer shell of the household item, and the at least one SWIR sensor and the at least one SWIR illumination element stored within an interior of the household item behind the barrier.

In a further implementation form of the first and second aspects, the SWIR illumination comprises a predefined SWIR pattern, and further comprising at least one hardware processor for executing a code stored on a memory, the code for receiving the at least one SWIR image including the predefined SWIR pattern, and analyzing the predefined SWIR pattern for a structured light application.

In a further implementation form of the first and second aspects, further comprising at least one hardware processor for executing a code stored on a memory, the code for receiving the at least one SWIR image, analyzing the at least one SWIR image to detect a reflective surface, the reflecting surface denoting a digital display, and generating an alert indicative of attempted malicious activity using a digital display presenting a digital image for authentication.

Unless otherwise defined, all technical and/or scientific terms used herein have the same meaning as commonly understood by one of ordinary skill in the art to which the present invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings and/or images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 9:
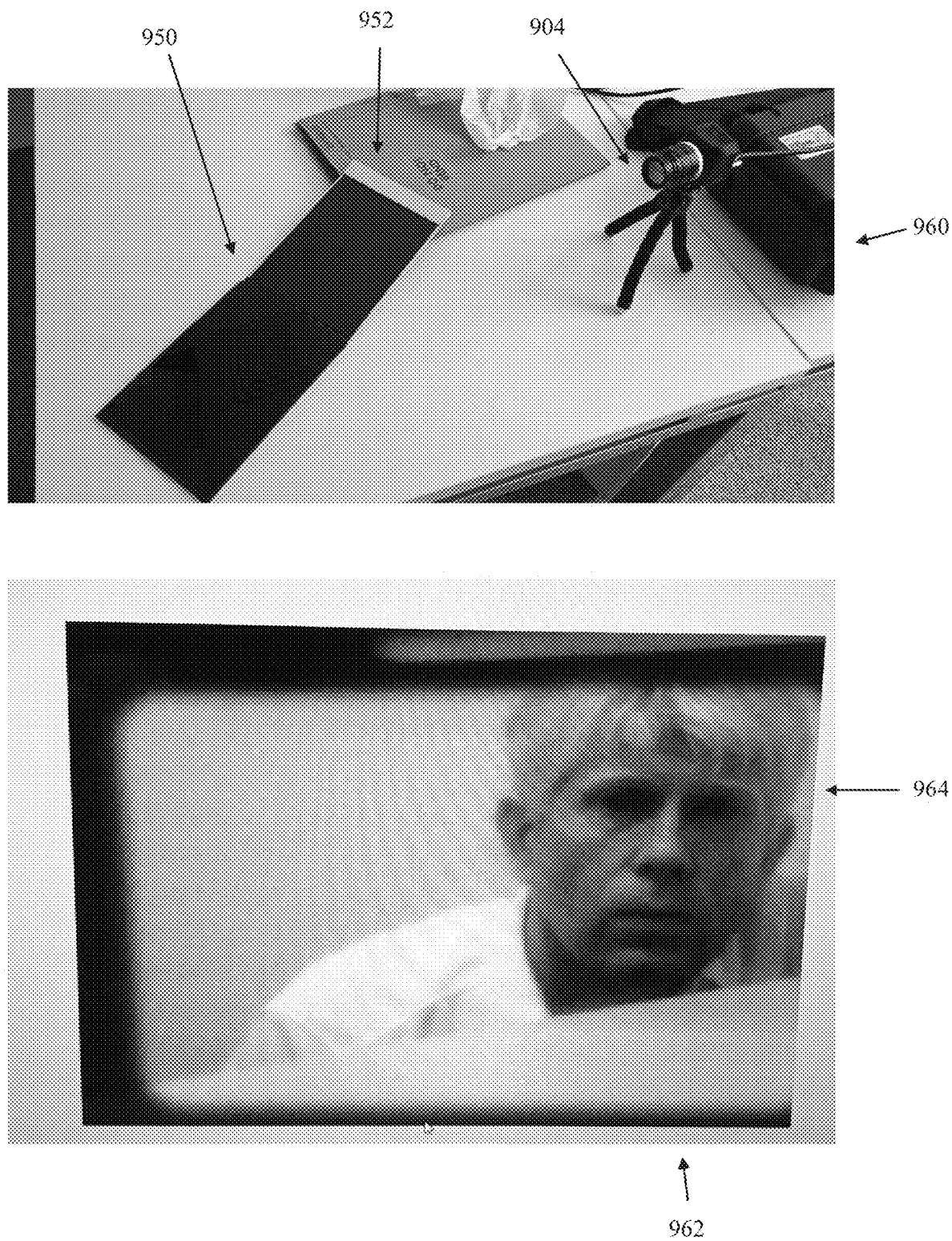

FIG. 9 is a schematic depicting a setup including a mirror on which is overlaid a barrier, and an SWIR camera pointed towards barrier and mirror for capturing SWIR images reflected off the mirror, in accordance with some embodiments of the present invention; and FIG. 10 is a schematic depicting an exemplary setup for discreet imaging of a scene, in accordance with some embodiments of the present invention.

DESCRIPTION OF SPECIFIC EMBODIMENTS OF THE INVENTION

The present invention, in some embodiments thereof, relates to camera sensors and, more particularly, but not exclusively, to systems and methods for discreet imaging of a scene.

An aspect of some embodiments of the present invention relates to an apparatus for discreet imaging of a scene, for example, where the sensor capturing images of the scene cannot be seen by a human eye and/or cannot be imaged by a visual light sensor (e.g., RGB sensor, CMOS, CCD) and/or cannot be detected by shining visible light towards it. The apparatus includes one or more short wave infrared (SWIR) sensors that capture SWIR images of the scene at one or more SWIR wavelength ranges. The apparatus may include one or more SWIR illumination elements that generate SWIR illumination at the SWIR wavelength range(s). The apparatus includes a barrier positioned within an entire field of view of the SWIR sensor(s), for example, located in front of the SWIR sensor(s). SWIR illumination reflecting off objects of the scene within the field of view passes through the barrier to reach the SWIR sensor(s). Optionally, all of the SWIR wavelengths that are sensed by the SWIR sensor(s) first pass through the barrier before arriving at the SWIR sensor(s). The barrier is made out of a material and/or has a thickness selected for being at least opaque to visible light and non-opaque to the SWIR wavelength range. The SWIR illumination element(s) may be positioned behind the barrier, or externally to the barrier.

The barrier is sufficiently at least opaque to visible light such that the SWIR sensor(s) located behind the barrier cannot be seen a human eye and/or the SWIR sensor(s) located behind the barrier are not depicted in images captured by a visible light sensor. The barrier is sufficiently opaque to visible light such that light of visible wavelengths that is directed at the SWIR sensor(s) behind the barrier is sufficiently absorbed and/or scattered such that any reflection of the light cannot be used to identify the location of the SWIR sensor(s). The barrier is sufficiently opaque to visible light such that a visible light sensor located behind the barrier (e.g., at the same spot as the SWIR sensor(s) captures visible light images that are of poor quality, for example, do not depict features of the scene at sufficient visibility and/or detail to classify the features of the scene.

The barrier is sufficiently permeable to illumination at the SWIR wavelength range(s) such that SWIR images captured by the SWIR sensor(s) behind the barrier are at a sufficiently high quality (e.g., signal to noise ratio above a threshold) to detect features of the scene, optionally by automated methods such as trained statistical classifiers. Even when the SWIR images captured by the SWIR sensor(s) behind the barrier are of a lower quality than SWIR images that would otherwise be captured by the SWIR sensor(s) without the barrier (i.e., the illumination of the SWIR wavelength range directly arrives at the SWIR sensor(s) without passing through the barrier first, the SWIR images captured by the SWIR sensor(s) behind the barrier are still of sufficient quality to accurately detect features of the SWIR images, for example, by automated trained statistical classifiers.

Optionally, the SWIR image(s) depicts a reflection of a face of a person, reflected off a display (e.g., LCD, television, connected to a computing device) presenting images (e.g., videos, information, entertainment, other media content). For example, the SWIR camera is positioned facing the back of the head of the person while the person is looking at the display. The display, which acts as a mirror for the SWIR illumination in the SWIR wavelength, reflects the SWIR image of the face off the person while the display is presenting other images. The SWIR image may be fed into an image analysis process (e.g., code stored on a memory for execution by one or more hardware processor) such as a classifier that is trained to analyze SWIR images depicting reflections of faces reflected by displays for outputting an identity of the face (e.g., name and/or other ID of the person). It is noted that the classifier may be specially trained and/or designed to identify the face depicted as a reflection, since such SWIR images may be off lower quality in comparison for example to SWIR images where the face is directed depicted (i.e., without a reflection). Moreover, additional processing may be required to identify the face within the reflective surface of the display.

At least some implementations of the apparatus, systems, and/or methods described herein improve the technology of biometric security, by increasing the security therefore against malicious attack. Standard biometric security is based on using visual light sensors (e.g., red, green, blue (RGB) sensors), to captures images of individuals, and authenticate the identity of the individual from the image. For example, an image of the face of the individual is captured, and the identity of the individual is validated when the image of the face is matched against another image stored in a database. Such biometric validation processes are prone to malicious attack, for example, presenting a digital video and/or digital image on a display to the biometric sensor (e.g., playing a video of the person whose identity is being stolen on a display of a tablet), and/or by a human attacker wearing a mask that has been manufactured to mimic the face of the person whose identity is being stolen. The human attacker is attempting to fool a visual light sensor by using the mask, into identifying the user identity according to the mask. At least some implementations of the apparatus, systems, and/or methods described herein, which are based on using SWIR sensors, SWIR illumination elements, and the barrier that hides at least the SWIR sensor to visible light, are resistant to attack by presentation of a digital image on a display and/or by wearing a mask. The SWIR illumination reflects off the display, such that the SWIR sensor captures an image of a reflection of itself, rather than capturing the image presented on the display. An image created from SWIR illumination reflected off the mask (i.e., when the mask is too thick and/or made of a material opaque to SWIR illumination) appears differently than an image created from SWIR illumination reflecting off the actual face of the attackers, enabling detecting the use of a mask. SWIR wavelengths do not significantly penetrate materials and/or thickness >0.5 millimeters (mm) i.e., common for a mask, to enable generating an image. However, a mask is generally made of materials which have a different water content and composition of human skin, resulting in different SWIR images when human skin and masks are images. At about 1500 nanometer (nm) water and human tissue show a departure from other materials and become absorbing. Hence Inventors discovered that a plastic/latex mask would appear quite similar in 1500 nm and 1000 nm, while a human face will appear bright at 1000 nm and dark at 1500-1550 nm, which is one exemplary process for differentiating between human skin and a mask. Moreover, the barrier hides the location SWIR sensor, making it difficult for the attacker to avoid or attempt to trick the SWIR sensor.

At least some implementations of the apparatus, systems, and/or methods described herein improve the technology of discreet imaging of a scene, for example, improving surveillance security. The visibility of standard sensors used to perform surveillance of a scene, which are based on visual light sensors, are placed within the visual field of the scene, making them visually visible to humans and/or to other visible light sensors, which allows the human to avoid the surveillance sensor. For example, a person entering a shopping venue that does not wish to be detected (e.g., to perform a malicious act) may use a hoodie and/or turn away from the camera so as to hide their face and remain undetected. Other approaches are hiding the surveillance camera in an object, and using pinhole optics to minimize the ability to visually detect the surveillance camera. However, pinhole cameras have low light gathering capabilities and therefore provide low quality images. Moreover, visible light camera may be detected visually (e.g., by close inspection) and/or by using the retro principle (i.e., when a light is flashed into the camera's field of view, the light is returned from the camera sensor, enabling detection of the camera).

At least some implementations of the apparatus, systems, and/or methods described herein, which are based on using SWIR sensors, SWIR illumination elements, and the barrier that hides at least the SWIR sensor to visible light, are resistant to detection using standard methods that may be used to detect sensors based on visual light. The barrier visually hides the SWIR sensor, from a standard visible light sensor and/or from the human eye. The visible light sensor and/or the human eye, which are unable to sufficiently see through the barrier, cannot see the SWIR sensor hiding behind the barrier. The SWIR sensor is able to capture images of the scene behind the barrier with sufficient quality, for example, to recognize objects and/or features in the scene. The barrier hides the SWIR sensor, enabling high quality optics and/or high quality images, as no pinholes are needed. Moreover, the retro principle cannot be used to detect the SWIR sensor hidden behind the barrier. In addition, the SWIR illumination cannot be detected by standard visible light sensors (e.g., CMOS and/or CCD) that are commonly available such as with camera phones and/or standard digital cameras, making it difficult to detect a SWIR illumination source with standard cameras.

At least some implementations of the apparatus, systems, and/or methods described herein improve the technology of discreet imaging of a scene by selection of the barrier that transmits sufficient reflection of SWIR illumination to a SWIR sensor(s) hidden behind the barrier, to generate images of a scene of sufficient quality that may be automatically processed by a computing device. For example, the images of the scene depict features with sufficient clarity to enable automatic recognition by a processor(s), for example, automated identification of faces.

At least some implementations of the apparatus, systems, and/or methods described herein improve the technology of discreet imaging of a scene by positioning the SWIR camera facing the back of the head of a person facing a display presenting image (e.g., media content). The SWIR camera captures SWIR images depicting the face of the person reflected off the display. The SWIR images are fed into a process trained to identify the person according to the face reflected in the display. The person may be entirely unaware that an image of their face is being captured from behind. Since the person cannot see their reflection off the display (since the reflection off the display occurs in the SWIR wavelength but not in the visible range), the person does not suspect that their reflection is being captured by a camera positioned behind the back of their head.

At least some implementations of the apparatus, systems, and/or methods described herein improve the technology of discreet imaging of a scene by using a reflective surface (e.g., mirror) with the barrier positioned in front of the reflective surface, for example, coat(s) of paint applied to the reflective surface, infrared dye, and/or a plastic layer with visible light blocking properties positioned over the reflective surface. The barrier prevents visual light from reaching the reflective surface, thereby visually blocking the mirror, i.e., a human cannot visually detect the presence of the mirror behind the barrier. The barrier is permeable to the SWIR illumination, such that SWIR illumination reflecting off objects in the scene is further reflected by the reflective surface, enabling the SWIR sensor(s) to capture images from the SWIR illumination reflected of the reflective surface with barrier. The reflective surface with barrier increases the flexibility of when the SWIR sensor(s) may be positioned, and/or increases the field of view of the SWIR sensor(s) which may use the reflective surfaces to capture images around corners and/or of scenes that are not in a direct line of sight. It is noted that the SWIR camera in such a setup may be without its own barrier in proximity, or with a barrier positioned in front of the SWIR camera. In another example, large mirrors with the applied barrier are placed on walls of the sides of a corridor. The SWIR cameras are placed cameras at a distance and/or on the ceiling. This SWIR cameras are not visible to the people walking in the corridor. The people walking in the corridor are SWIR imaged through the reflection provided by the mirrors and/or directly no matter where they look. Mirrors and the material used for the barrier (e.g., paint, plastic) are low cost, and may be easy to set up on any wall and/or surface. For example, the mirror with barrier may be placed on the floor.

It is noted that NIR (0.7-1.0 micron) cameras may be detected using the same approaches used to detect visible light camera, for example, by using an imaging device with silicon (e.g., CCD and/or CMOS) detectors.

It is noted that radar based and/or far infra-red cameras cannot be used for traditional biometrics and/or provide lower quality images in compared to SWIR cameras, and/or are significantly more expensive than SWIR cameras.

Before explaining at least one embodiment of the invention in detail, it is to be understood that the present invention is not necessarily limited in its application to the details of construction and the arrangement of the components and/or methods set forth in the following description and/or illustrated in the drawings and/or the Examples. The present invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
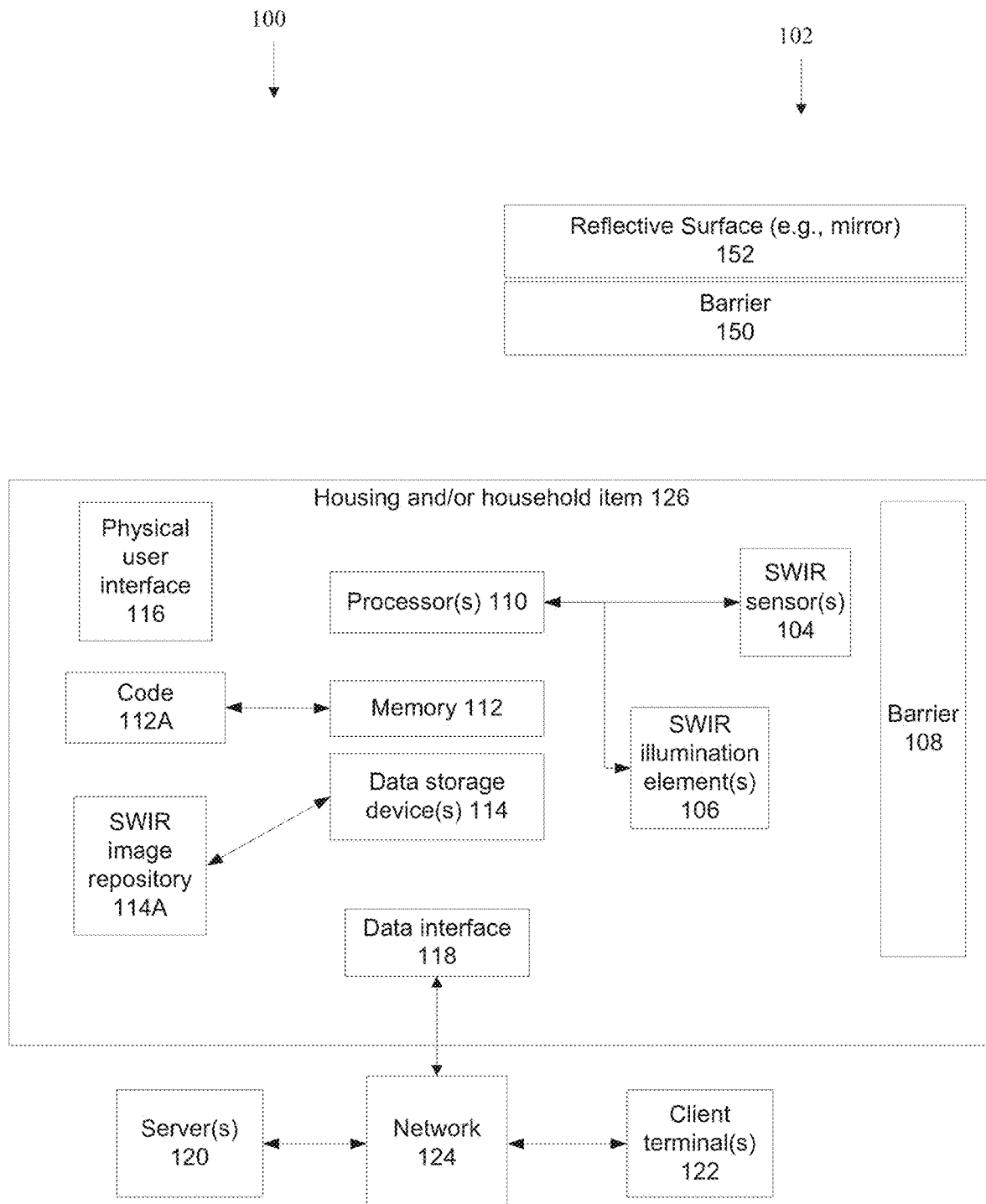
FIG. 1 is a schematic of a block diagram of components of a system for discreet imaging of a scene, in accordance with some embodiments of the present invention.

Reference is now made to FIG. 1, which is a schematic of a block diagram of components of a system 100 for discreet imaging of a scene, in accordance with some embodiments of the present invention. System 100 includes an apparatus 102 or discreet imaging of the scene. The scene may be, for example, an entrance to a shopping mall, a parking lot, a city street, a yard of a house, and/or other environments being monitored and/or surveyed, for example, for security purposes.

Apparatus 102 includes one or more SWIR sensor(s) 104 that capture SWIR image(s) of the scene at a SWIR wavelength range. Examples of SWIR sensor(s) 104 include: Plasmon based CMOR, balometer array based FIR, and 3D passive imaging.

For clarity and simplicity of explanation, as used herein, the term SWIR sensor refers to one or more SWIR sensors, and the term SWIR illumination element refers to one or more SWIR illumination elements.

Apparatus 104 may include one or more SWIR illumination element(s) 106 that generates SWIR illumination at the SWIR wavelength range detectable by the SWIR sensor 104.

Apparatus 102 includes a barrier 108 positioned within an entire field of view of the SWIR sensor 104, for example, located in front of the SWIR sensor 104. SWIR illumination (e.g., generated by SWIR illumination element 106) reflecting off objects of the scene within the field of view passes through the barrier to reach the SWIR sensor 104. Optionally, all of the SWIR wavelengths that are sensed by the SWIR sensor 104 first pass through barrier 108 before arriving at SWIR sensor 104. Barrier 108 is made out of a material and/or has a thickness selected for being opaque to visible light and non-opaque to the illumination at the SWIR wavelength range.

Alternatively or additionally, a barrier 150 is placed in front of a reflective surface 152, for example, mirror. Barrier 150 is made out of a material and/or has a thickness selected for being opaque to visible light and non-opaque to the illumination at the SWIR wavelength range. Examples of barrier 150 include one or more coatings, for example, paint (e.g., sprayed and/or brushed on) optionally of a dark color for example, black, dark blue, dark green, and brown, for example, Spectre 150 from Epolin®. In another example, barrier 150 includes a plastic opaque and/or blocking visual light, optionally rigid, for example, Luminate 7276E by Epolin or 9C20 by Plexiglas® or ACRYLITE®. IN another example, barrier 150 includes an infrared dye.

Barrier 108 may sometimes be interchanged with barrier 150, and/or refer to both barrier 108 and barrier 150.

Barrier 150 may have one or more features as described herein with reference to barrier 108.

Barrier 150 visually (i.e., in the visual wavelength, as seen by a human and/or captured by a visual light sensor) blocks reflective surface 152 while enabling SWIR illumination to be reflected off reflective surface 152. SWIR images captured by SWIR sensor(s) 104 of reflective surface 152 depict the objects reflected by reflective surface 152, while visual light images captured by a visual light sensor depict barrier 150. Barrier 150 and reflective surface 152 enable discreet SWIR imaging of a scene by SWIR sensor(s), for example, down a long corridor and/or around a corner.

It is noted that different architectures may be selected, for example, barrier 150 with reflective surface 152 without barrier 108, barrier 108 without barrier 150 with reflective surface 152, and both barrier 108 and barrier 150 with reflective surface 152.

The visible light to which barrier 108 is opaque may include near infrared wavelengths, optionally in the range of about 700 nanometers to one micrometer.

SWIR illumination element 106 may be positioned behind barrier 106 such that the SWIR illumination generated by SWIR illumination element 106 passes through barrier 106 towards the scene before being reflected by objects in the scene, or may be positioned externally to barrier 106 such that the generated SWIR illumination does not pass through barrier 106 when transmitted towards the scene.

The barrier 108 may be of a dark color under visible lights, for example, black, brown, dark blue, and dark green. The dark color may further distract the attention of the person whose image is being captured, for example, the person may not suspect a camera located behind the dark barrier since visible light images cannot be captured behind the dark barrier. It is noted that the barrier 108 may be of light colors, for example, white, yellow, red, light blue, light green, and purple.

The barrier 108 may be made of a material opaque to visible light, for example, cloth (e.g., spandex, lycra, polyester), at least one layer of paint, plastic (e.g., lexan, polyester), silicon, LCD screen, polycarbonate such as that used in a sunglass lens, and/or a sunglass lens. The material may further distract the attention of the person whose image is being captured, for example, the person may not suspect a camera located behind the material since visible light images cannot be captured behind the material. The materials may be incorporated into a housing as discussed herein.

The thickness of barrier 108, is for example, less than about 1 millimeter (mm), or 3 mm, or 5 mm, or 7 mm, or 10 mm, or other values, or for example, about 1-3 mm, or about 3-7 mm, or 1-5 mm, or 1-7 mm, or other values.

The area of barrier 108 is optionally selected to cover the entire field of view of SWIR sensor 104, for example the area of barrier 108 is selected according to a distance from SWIR sensor 104. SWIR images captured by SWIR sensor 104 may be created only from SWIR illumination that passed through barrier 108. SWIR illumination that does not pass through barrier 108 may not be sensed by SWIR sensor 104.

SWIR images captured by SWIR sensor 104 may be at a higher quality level (e.g., above (or below) a threshold) than visible light image captured by a visible light sensor placed at the same location of the SWIR sensor 104 (e.g., quality of the visible light images is below (or above) the threshold), for example, the visible light sensor is substituted for the SWIR sensor. The barrier 108, which is opaque to visible light and non-opaque to SWIR illumination at the SWIR wavelength range results in lower quality visible light images and high quality SWIR images when captured by respective sensors behind barrier 108.

Optionally, the SWIR image(s) of the scene captured by the SWIR sensor 104 behind the barrier 108 (i.e., SWIR energy crosses barrier 108 to reach SWIR sensor 104) have a lower quality (e.g., quality level below a threshold) in comparison to a visible light sensor positioned to capture a visible light image of the scene where the visible light does not pass through the barrier prior to being captured by the visible light sensor (e.g., barrier is removed and/or visible light sensor positioned in front of barrier), for example, the visible light sensor captures the visible light images at a quality level above the threshold. Even when the quality of the SWIR image(s) captured by SWIR senor(s) 104 behind the barrier is lower than visible light images captured by a visible light sensor without passing through the barrier, the SWIR images may still be comparable in quality to the visible light images, for example, a trained classifier that classifiers the images and/or identifies features performs classification and/or identifies features of the SWIR images and visible light images within a similar accuracy level (e.g., within a tolerance range). Exemplary features and/or classification categories include: a face, a person, a pose, a gesture, and a measurement of a body of a person. The features may be used to perform biometric analysis to identify an identity of the user, for example, according to the face, gesture, and/or measurement of the body. In another example, the features may be analyzed to detect malicious behavior, for example, based on suspicious gestures and/or suspicious poses. Alternatively or additionally, the features include the identity of the user, for example, the face denotes the identity of the user according to the face. Users may be classified, for example, as valid users (e.g., which may be granted access), and/or invalid users (e.g., which are denied access) and/or known criminals (e.g., security is alerted). Optionally, the material and thickness of the barrier are selected such that the quality level of the SWIR image(s) captured by the SWIR sensor is within the tolerance range of the quality level of the visible light image(s) captured by the visible light sensor using visible light non-passing through the barrier.

The quality level may be determined, for example, by computing the signal to noise ratio (SNR) for the image. SWIR images have a high SNR (e.g., above a threshold), while visible light images captured by a visible light sensor placed at the location of the SWIR sensor 104 behind barrier 108 have a low SNR.

Optionally, the quality level (e.g., SNR) of the SWIR image(s) denotes a requirement of an accuracy of automatically identifying one or more features in the SWIR image, for example, by a trained statistical classifier (e.g., included in code 112A). Features may be fed into and/or computed by code 112A for identifying one or more of the following in the SWIR image(s) (e.g., classification categories): a face, a person, a pose, a gesture, and a measurement of a body of a person. The features may be used to perform biometric assessment of the person, for example, to determine an identity of the person according to the face, gesture, and/or measurements of the body. The identity may be determined by code 112A and/or a trained classifier and/or another trained model. The requirement may be, for example, at least 50% confidence, or at least 70%, or at least 80%, or at least 90% confidence, or about 50-90% or 60-80% confidence, or other values.

The material and/or thickness of barrier 108 may be selected for the trained statistical classifier to classify SWIR images at a confidence level that meets the requirement. The trained statistical classifier (e.g., code 112A) may process a single image at a time, or multiple images, for example, a sequence of images captured as a video.

Optionally, the code 112A includes instructions for analyzing the SWIR image(s) to recognize at least one feature depicted within the respective SWIR image, for example, a face, a person, a pose, a gesture, and a measurement of a body of a person. The feature may be a classification category (e.g., type of gesture) and/or an identity of the person (e.g., name of the person) and/or a value (e.g., measurement of height). The feature may be fed into another process for performing biometric analysis and/or the feature may be output of the biometric analysis, for example, the name and/or identification of the person depicted in the SWIR image. Optionally, when a visual light sensor is placed behind barrier 108 such that visible light hitting the visual light sensor first passes through barrier (108) (e.g., substituted with and/or beside SWIR senor 104), code 112A fails to identify (e.g., classify, detect) the feature(s) depicted in the visible light image. For example, the quality of the visible light image is low such that the accuracy of the classifier is low. In another example, the amount of visible light passing through the opaque barrier is insufficient to even create a visible light image.

Optionally, the code 112A includes instructions for outputting an identity of a face of a person depicted in the SWIR image reflected off a display (e.g., as described herein), for example, a name and/or identification of the person. The code 112A (e.g., classifier) may be trained to identify faces of people depicted in the SWIR image as a reflection off a display. The training may be required, for example, since SWIR images reflected off a display presenting other content may have a lower quality than non-reflected images and/or may require additional processing (e.g., to segment the face from the reflective surface of the display). Without training and/or with training using non-reflected images the accuracy of the classifier may be lower than a classifier trained for reflected images. Code 112A may include instructions for feeding the SWIR image into the classifier (e.g., image analysis process).

Optionally, the code 112A includes instructions for analyzing the SWIR image(s) to detect a reflective surface. The code may include instructions for generating an alert indicative of attempted malicious activity using a digital display presenting a digital image for authentication. The reflective surface may be a display, for example, of a smartphone, a tablet, and/or a monitor of a computer. A malicious user may present an image on the display, which is presented to a sensor, for example, in order to gain restricted access. For example, the malicious user obtains an image of an employee and/or an image of the identity card of the employee that is known to obtain access, and presents the image of the employee in an attempt to "trick" the sensor into recognizing the image as a valid user and grant restricted access to the employee. The malicious user uses the access granted to the employee in the image. Since as described herein displays appear as reflective surfaces in SWIR images, and the image presented by the display is not depicted in the SWIR image, detecting the reflective surface in the SWIR image may be indicative of an attempt to gain malicious access by presenting an image.

Optionally, the code 112A includes instructions for analyzing the SWIR image(s) to detect an indication of a mask, optionally worn by a human attempting to impersonate the person whose face is depicted by the mask. It is noted that other than a mask, the malicious person may attempt to use a doll (e.g., mannequin). The term mask may sometimes refer to the doll. The indication of the mask may trigger an alert, for example, indicating malicious activity. The indication of the mask may be detected by comparing an SWIR image obtained at about 1000 nm and another SWIR image obtained at about 1500-1550 nm. When the two images are statistically similar in terms of similar pixel intensity values, for example, according to a correlation requirement such as range and/or threshold, the indication of the mask is detected. When the two images are not statistically similar in terms of similar pixel intensity values, for example, according to the correlation requirement such as range and/or threshold, the indication of the mask is not detected, and optionally an indication of a human face is detected. At about 1500 nm water and human tissue show a departure from other materials and become absorbing. Hence a plastic/latex mask would appear quite similar in 1500 nm and 1000 nm, while a human face will appear bright at 1000 nm and dark at 1500-1550 nm, which is one exemplary process for differentiating between human skin and a mask.

Optionally, the field of view depicted within the SWIR image is wider than a field of view of a visible light image captured by a visible light sensor through a pinhole, when the visible light sensor is substituted for the SWIR sensor and even when no barrier is used. As such, SWIR images captured behind the barrier may be of a wider field of view than visible light images captured through a pinhole by a visible light sensor without a barrier.

Optionally, the SWIR illumination includes a predefined SWIR pattern, for examples, created using structured light. Code 112A may include instructions for analyzing the predefined SWIR pattern of the SWIR image for a structured light application.

Optionally, system 100 includes one or more of the following components:

Hardware processor(s) 110, which may interface with SWIR sensor(s) 104 for receiving SWIR image(s). Hardware processor(s) 110 may interface with other components, described herein.

Hardware processor(s) 110 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 110 may include a single processor, or multiple processors (homogenous or heterogeneous) arranged for parallel processing, as clusters and/or as one or more multi core processing devices.

Memory 112, which stores code 112A for execution by processor(s) 110. Memory 112 may stores code instructions executable by hardware processor(s) 110, such as code 112A. Memory 112 may be implemented, for example, a random access memory (RAM), read-only memory (ROM), and/or a storage device, for example, non-volatile memory, magnetic media, semiconductor memory devices, hard drive, removable storage, and optical media (e.g., DVD, CD-ROM).

Data storage device(s) 114, which may store data, for example, SWIR image repository 114A that stores the captured SWIR images. Data storage device(s) 114 may be implemented as, for example, a memory, a local hard-drive, virtual storage, a removable storage unit, an optical disk, a storage device, and/or as a remote server and/or computing cloud (e.g., accessed using a network connection).

Physical user interface 116 that includes a mechanism for user interaction, for example, to enter data (e.g., selection processing of SWIR images) and/or to view data (e.g., the captured SWIR images and/or the detection of features in the SWIR images). Exemplary physical user interfaces 116 include, for example, one or more of, a touchscreen, a display, gesture activation devices, a keyboard, a mouse, and voice activated software using speakers and microphone. It is noted that the user interface (e.g., touch screen) of client terminal(s) 122 may be used as user interface 116.

Data interface 118. Data interface 118 provides communication with external devices (e.g., server(s) 120 and/or client terminal(s) 122) optionally over a network 124, for example, for providing captured SWIR images and/or for providing results of analysis of SWIR images by code 112A and/or for receiving instructions for control of SWIR sensor(s) 104 and/or processor(s) 110 and/or other components. For example, the SWIR images and/or video captured by SWIR sensor(s) 104 may be streamed (e.g., in real time) over network 124 to server(s) 120 and/or client terminal(s) 122 for remote viewing and/or remote processing.

Data interface 118 may be implemented as, for example, one or more of, a USB port, a network interface card, an antenna, a wireless interface to connect to a wireless network, a physical interface for connecting to a cable for network connectivity, a virtual interface implemented in software, network communication software providing higher layers of network connectivity, and/or other implementations.

Network 124 may be implemented as, for example, the internet, a broadcast network, a local area network, a virtual network, a wireless network, a cellular network, a local bus, a point to point link (e.g., wired), and/or combinations of the aforementioned. It is noted at a cable connecting processor(s) 110 and another device may be referred to herein as network 124.

Server(s) 120 and/or client terminal(s) 122 may be implemented as, for example one or more and/or combination of: a group of connected devices, a client terminal, a server, a search engine server, a virtual server, a computing cloud, a virtual machine, a desktop computer, a thin client, a network node, a network server, and/or a mobile device (e.g., a Smartphone, a Tablet computer, a laptop computer, a wearable computer, glasses computer, and a watch computer).

Server(s) 120 may be implemented as, for example, a security server that may analyze the received SWIR images(s) (using code 112A stored on a memory associated with the respective server) and/or grant access to the user upon identification. Client terminal 122(s) may be implemented as, for example, a mobile device of a user to which SWIR image(s) are streamed live for monitoring an environment such as monitoring behavior of a caretaker and baby.

Communication between processor(s) 110 and/or server(s) 120 and/or client terminal(s) 122 over network 124 may be implemented, for example, via an application programming interface (API), software development kit (SDK), functions and/or libraries and/or add-ons added to existing applications executing on server(s) 120 and/or client terminal(s) 122, and/or an application for download and execution on server(s) 120 and/or client terminal(s) 122 that communicates with processor(s) 110, function and/or interface calls to code executed by processor(s) 110.

Optionally, one or more components of apparatus 102 are included, optionally enclosed, within a housing 126. Housing 126 includes SWIR sensor(s) 104, optionally includes barrier 108, and may include one or more of the following components: SWIR illumination element(s) 106, processor(s) 110, memory 112, code 112A, data storage device(s) 114, SWIR image repository 114A, physical user interface 116, and data interface 118.

Optionally, housing 126 is implemented as a household item. Barrier 108 may be formed as a continuation of an outer shell of household item 126. The SWIR sensor 104 and one or more other components may be stored within an interior of the household item 126, where SWIR sensor 104 is positioned behind barrier 108. Exemplary household items 126 include: a stuffed animal, a book, a picture in a picture frame, a television, an LCD display, an LCD visible light source, a motion sensor device, and an air vent. Household item 126, which captures SWIR images using SWIR sensor 104 hidden therein behind barrier 108, may be visually indistinguishable from normal household items, enabling discreet imaging of the scene.

It is noted that optical components may be installed within apparatus 102 and/or housing 126 for improving image quality of SWIR sensor(s) 104, for example, zoom lenses and/or automatic focusing mechanisms. The optical components are not visually discernible externally to apparatus and/or housing 126, for example, to human observers and/or to visual light sensors.

It is noted that code 112A may be stored on memory 112 located within apparatus 102 and/or within housing 126, for example, for local analysis and/or processing of SWIR images captured by SWIR sensor(s) 104. Alternatively or additionally, one or more portions of code 112A may be stored externally to apparatus 102, for example, on a memory located in association with server(s) 120 and/or client terminal(s) 122, for example, SWIR images captured by SWIR sensor(s) 104 are provided over network 124 for remote analysis and/or processing by server(s) 120 and/or client terminal(s) 122.

Code 112A may include instructions for detecting features in SWIR images, for example, a trained classifier, as described herein. The classifier may be trained using a supervised and/or non-supervised approach. Examples of classifiers include one or more neural networks of various architectures (e.g., artificial, deep, convolutional, fully connected), support vector machine (SVM), logistic regression, k-nearest neighbor, decision trees, and combinations of the aforementioned. The classifier may be trained using a training dataset of SWIR images captured by a SWIR sensor(s) using a barrier, SWIR images captured as reflections off a display, SWIR images captured directly by the SWIR sensor(s) without passing through the barrier, and/or visible light images captured by a visible light sensor. The classifier may be trained to detect features in the images and/or received detected features and perform a biometric analysis to identify a user.

Figure 2:
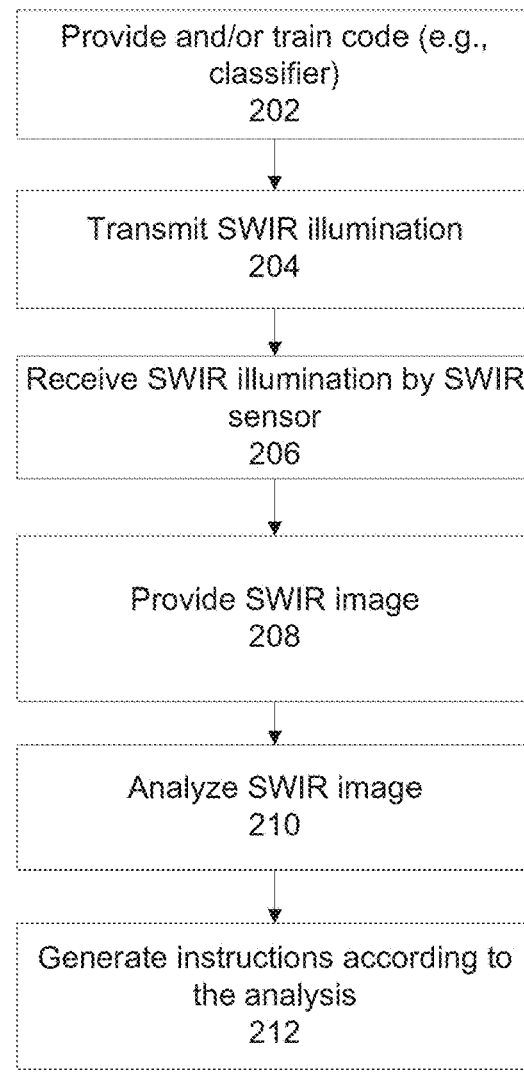
FIG. 2 is a flowchart of a method for discreet imaging of a scene, in accordance with some embodiments of the present invention.

Reference is now made to FIG. 2, which is a flowchart of a method for discreet imaging of a scene, in accordance with some embodiments of the present invention. Components of system 100 described with reference to FIG. 1 may implement the method described with reference to FIG. 2, for example, SWIR sensor(s) 104 capture SWIR images passing through barrier 108, and/or processor(s) 110 executing code instructions (e.g., code 112A) stored in memory 112 for processing and/or analyzing the images, for example, for detecting features depicted therein.

At 202, code for analysis of SWIR images is provided. Optionally, a classifier and/or other model is provided and/or trained. The classifier may detect features in the SWIR images as described herein, and/or classify the SWIR images such as outputting the identity of the person depicted in the SWIR image(s). The features may be analyzed to output the identity of the person. The code may analyze the SWIR images(s) and output an indication of detected malicious activity, optionally based on the features.

At 204, SWIR illumination of a SWIR wavelength range may be generated. The SWIR illumination is transmitted towards the scene. The SWIR illumination may pass through a barrier opaque to visible light on the path to the scene.

Alternatively, the SWIR illumination does not pass through the barrier on the path to the scene.

At 206, the SWIR illumination is received by a SWIR sensor(s). The SWIR sensor is located behind the barrier. The SWIR illumination, which is reflected off one or more objects (e.g., faces) in the scene, passes through the barrier before being sensed by the SWIR sensor.

At 208, one or more SWIR images may be provided. The SWIR images are generated from the received reflected SWIR illumination that has passed though the barrier and sensed by the SWIR sensor.

The SWIR images may be provided as individual images and/or as a stream (e.g., video). The SWIR images may be, for example, stored on a memory, presented on a display, forwarded to a remote device, and/or provided to a local process for further processing.

At 210, the SWIR images are analyzed, for example, by the classifier. The classifier may detect one or more features, and/or identify the depicted person and/or identify an indication of malicious activity.

The SWIR images may be analyzed by code, for example, to detect an indication of a mask.

At 212, instructions may be generated in response to the output of the code (e.g., classifier). For example, in response to an identification of the person, the person is granted access to a security environment. In another example, in response to an indication of detected malicious activity, security may be notified. In another example, in response to detection of a mask, security may be notified.

The instructions may be for manual and/or automatic implementation. For example, the instructions may be for manual implementation, for example, presenting a pop-up window on a display of a surveillance server stating "Malicious activity detected, call police now". In another example, the instructions may be for automatic implementation, for example, code for execution by one or more processors. For example, the instructions are to automatically open a door when an identity of the face of the person depicted in the SWIR image(s) is matched with a list of employees.

Figure 3:
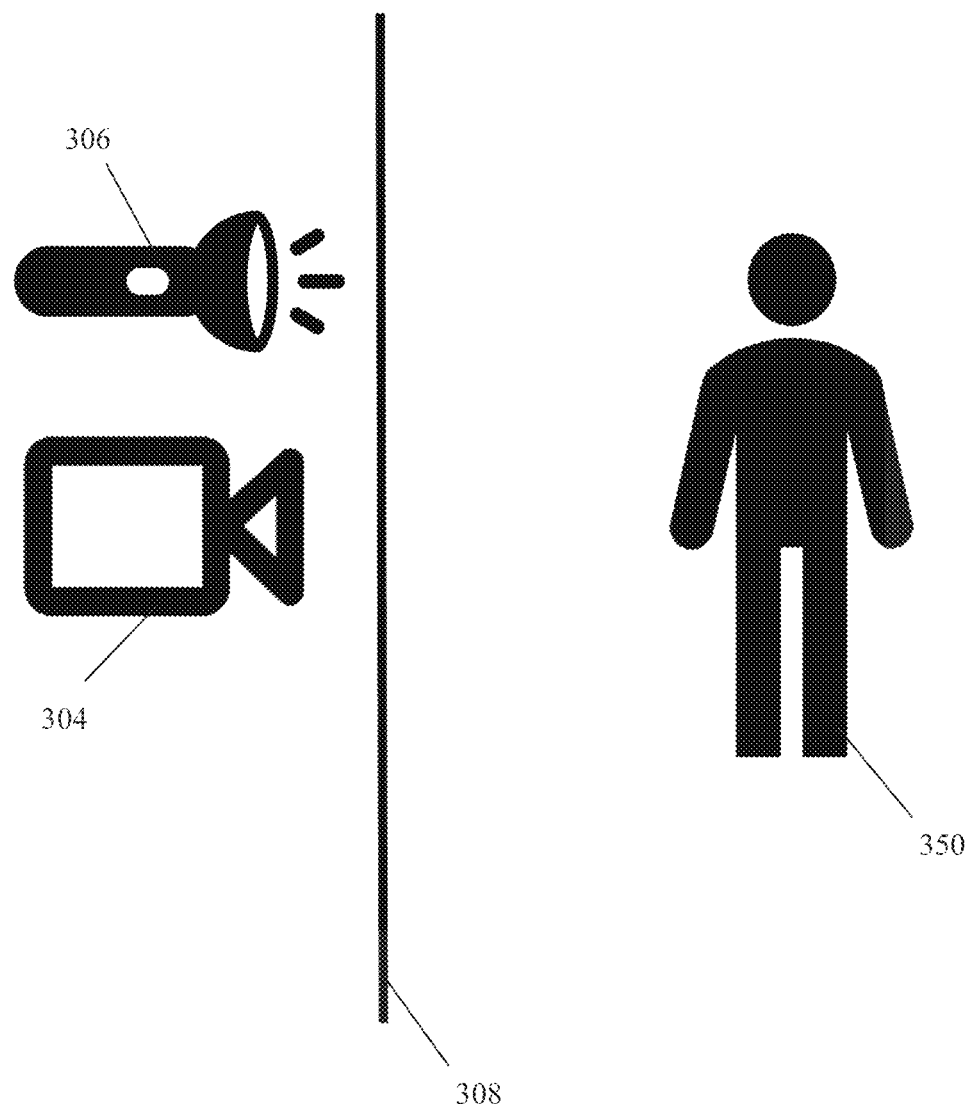
FIG. 3 is a schematic depicting an exemplary setup for discreet imaging, in accordance with some embodiments of the present invention.

Reference is now made to FIG. 3, which is a schematic depicting an exemplary setup for discreet imaging, in accordance with some embodiments of the present invention. The setup depicted with respect to FIG. 3 may be implemented using components of system 100 described with reference to FIG. 1, and/or use in the method described with reference to FIG. 2. A SWIR illumination element 306 is positioned behind a barrier 308. The SWIR illumination generated by SWIR illumination element 306 crosses barrier 308 to illuminate a person 350 (or other objects in the scene). The SWIR illumination is reflected off person 350, crosses barrier 308, and is captured by a SWIR sensor 304. SWIR images of person 350 are generated from output of SWIR sensor 304.

Figure 4:
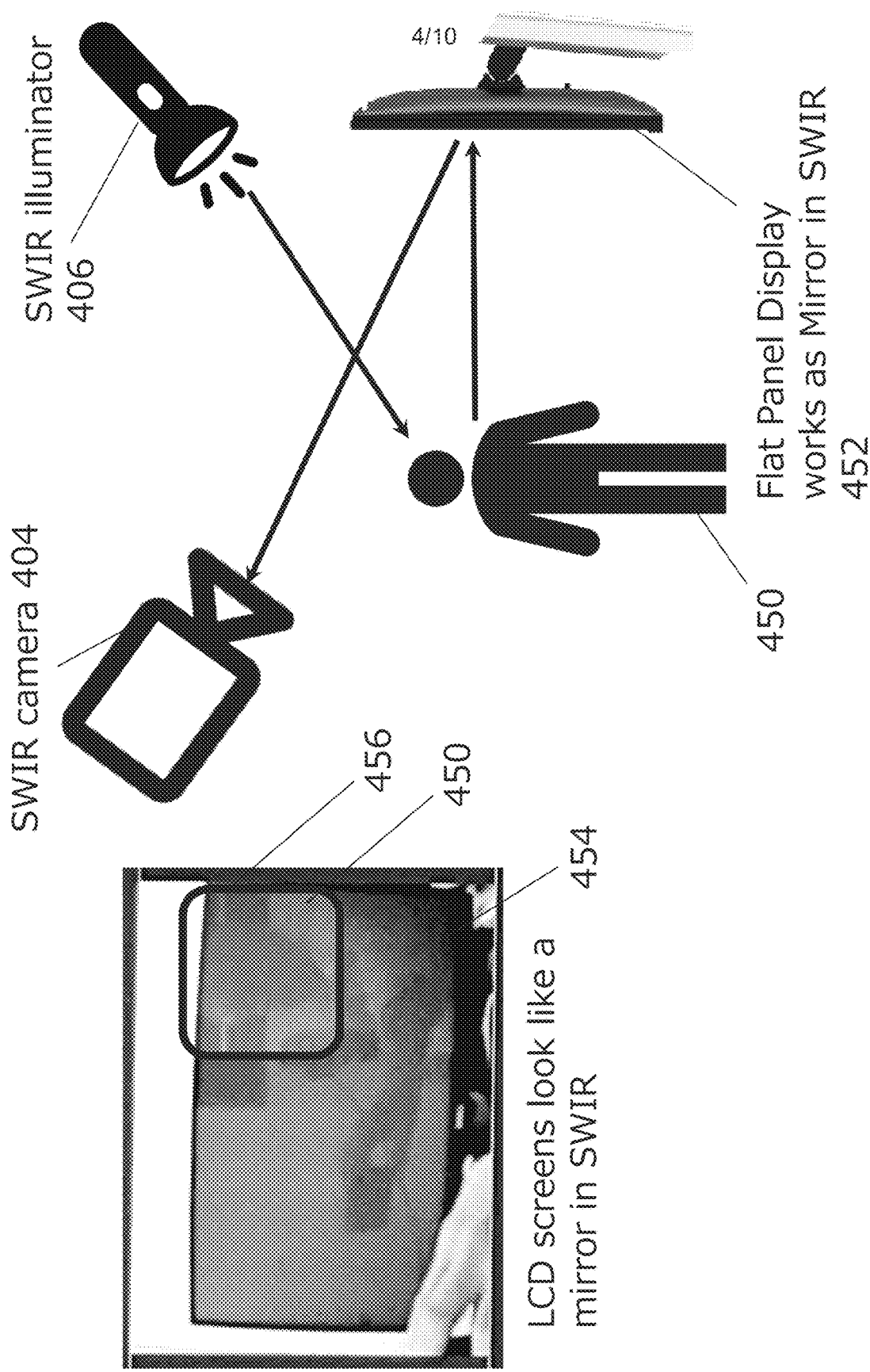
FIG. 4 is a schematic depicting an exemplary setup for discreet imaging of a person, in accordance with some embodiments of the present invention.

Reference is now made to FIG. 4, which is a schematic depicting an exemplary setup for discreet imaging of a person 450, in accordance with some embodiments of the present invention. SWIR illumination generated by SWIR illumination element 406 which is reflected by person 450, is further reflected by a display 452 (e.g., LCD and/or flat panel), and sensed by SWIR camera 404. Display 452 acts as a mirror for SWIR wavelengths. Schematic 454 depicts the SWIR image captured by SWIR camera 404, where person 450 is discernible within region 456.

Reference is now made to FIG. 10, which is a schematic depicting an exemplary setup for discreet imaging of a scene, in accordance with some embodiments of the present invention. The scene may be, for example, a hallway 1072 where people 1074A-B are walking. Reflective surfaces 1052 (e.g., mirrors) associated with barriers 1050 (e.g., painted thereof, positioned in front, applied dye) are positioned along the walls of hallway 1072. Due to the property of barrier 1050, reflective surface 1052 beneath barrier 1050 is not visible to people 1074A-B, which only see barrier 1050. SWIR illumination reflects off people 1074A-B, travels through barrier 1050, is reflected by reflective surface 1052, travels through barrier 1050 again, and is received by SWIR cameras 1004 for creating SWIR images of the reflection of people 1074A-B within hallway 1072.

It is expected that during the life of a patent maturing from this application many relevant SWIR sensors and SWIR illumination elements will be developed and the scope of the terms SWIR sensors and SWIR illumination elements are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the present invention, which are, for clarity, described in the context of separate embodiments, may also be provided in combination in a single embodiment. Conversely, various features of the present invention, which are, for brevity, described in the context of a single embodiment, may also be provided separately or in any suitable subcombination or as suitable in any other described embodiment of the present invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the present invention in a non-limiting fashion.

Figure 5:
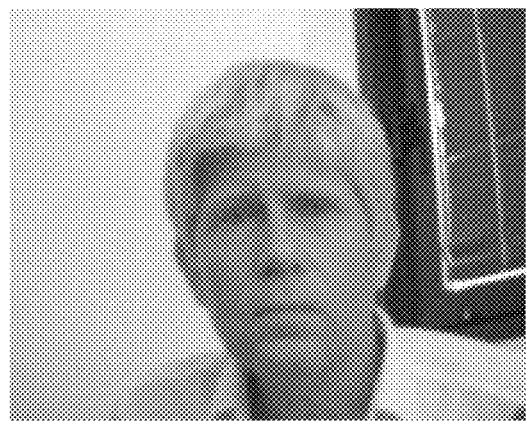
FIG. 5 is a SWIR image captured directly by an SWIR sensor and another SWIR image captured by a SWIR sensor positioned behind one lens of dark sunglasses, in accordance with some embodiments of the present invention.
Figure 5:

Reference is now made to FIG. 5, which includes a SWIR image 502 captured directly by an SWIR sensor (i.e., without a barrier positioned in front of the sensor) and another SWIR image 504 captured by a SWIR sensor positioned behind one lens of dark sunglasses, in accordance with some embodiments of the present invention. Images 502 and 504 have similar quality. Even when image 504 is of lower quality than image 502 (e.g., lower signal to noise) due to the presence of the dark lens barrier, the quality of image 504 is sufficiently high to manually and/or automatically discern facial features for manual and/or automatic detection of the identity of the person depicted in the image. It is noted that the SWIR sensor positioned behind the dark lens cannot be visually detected even under a flashlight illumination of visible wavelengths.

Figure 6:
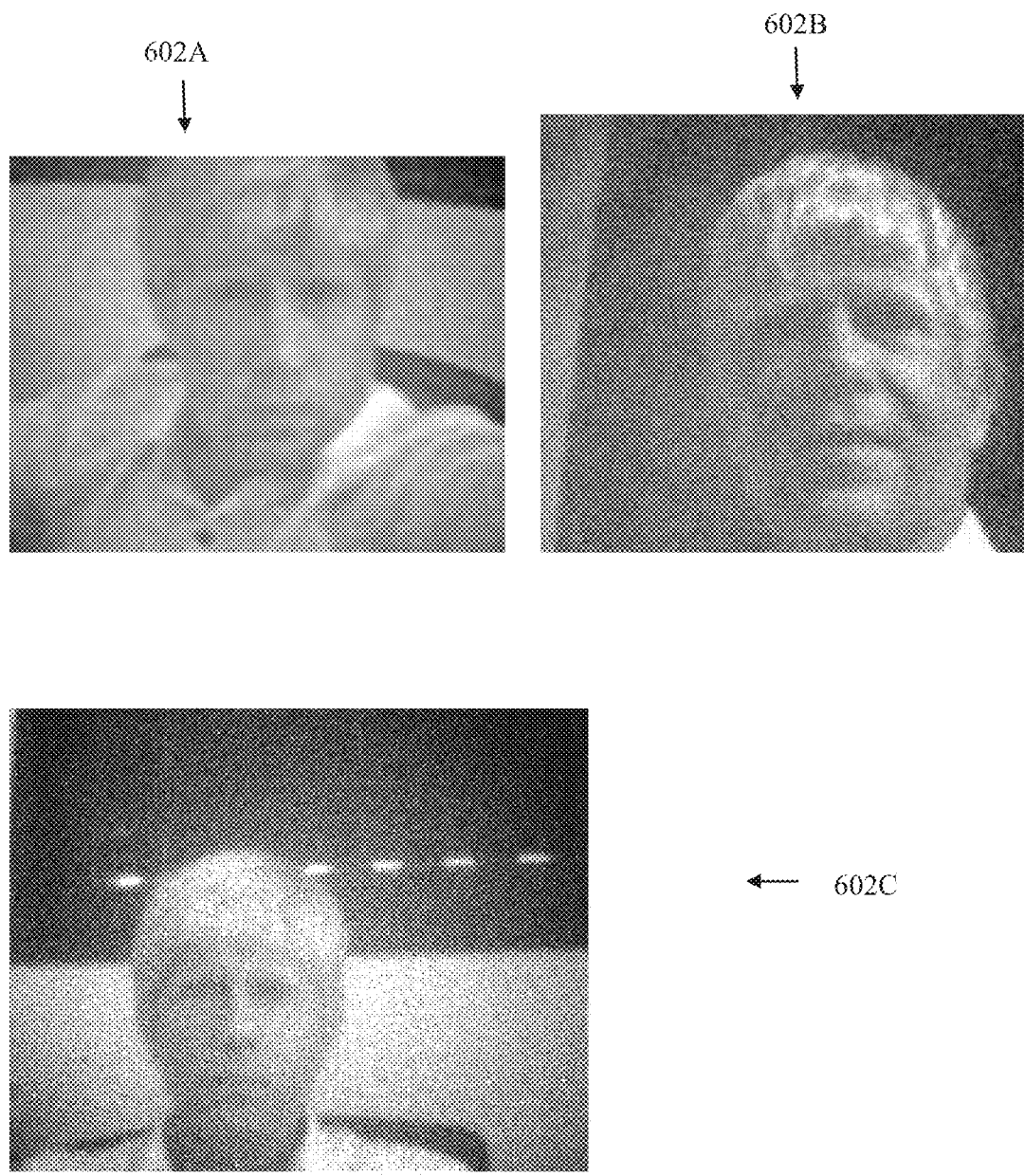
FIG. 6 is SWIR images which are captured by an SWIR sensor located behind a matt, thin, dark elastane, in accordance with some embodiments of the present invention.

Reference is now made to FIG. 6, which includes SWIR images 602A-C which are captured by an SWIR sensor located behind a matt, thin, dark elastane (spandex) garment of 92% polyester and 8% spandex, in accordance with some embodiments of the present invention. The quality of SWIR images 602A-C is sufficiently high to manually and/or automatically discern facial features for manual and/or automatic detection of the identity of the person depicted in the image, even in the presence of the elastane barrier. It is noted that the SWIR sensor positioned behind the elastane cannot be visually detected.

Figure 7:
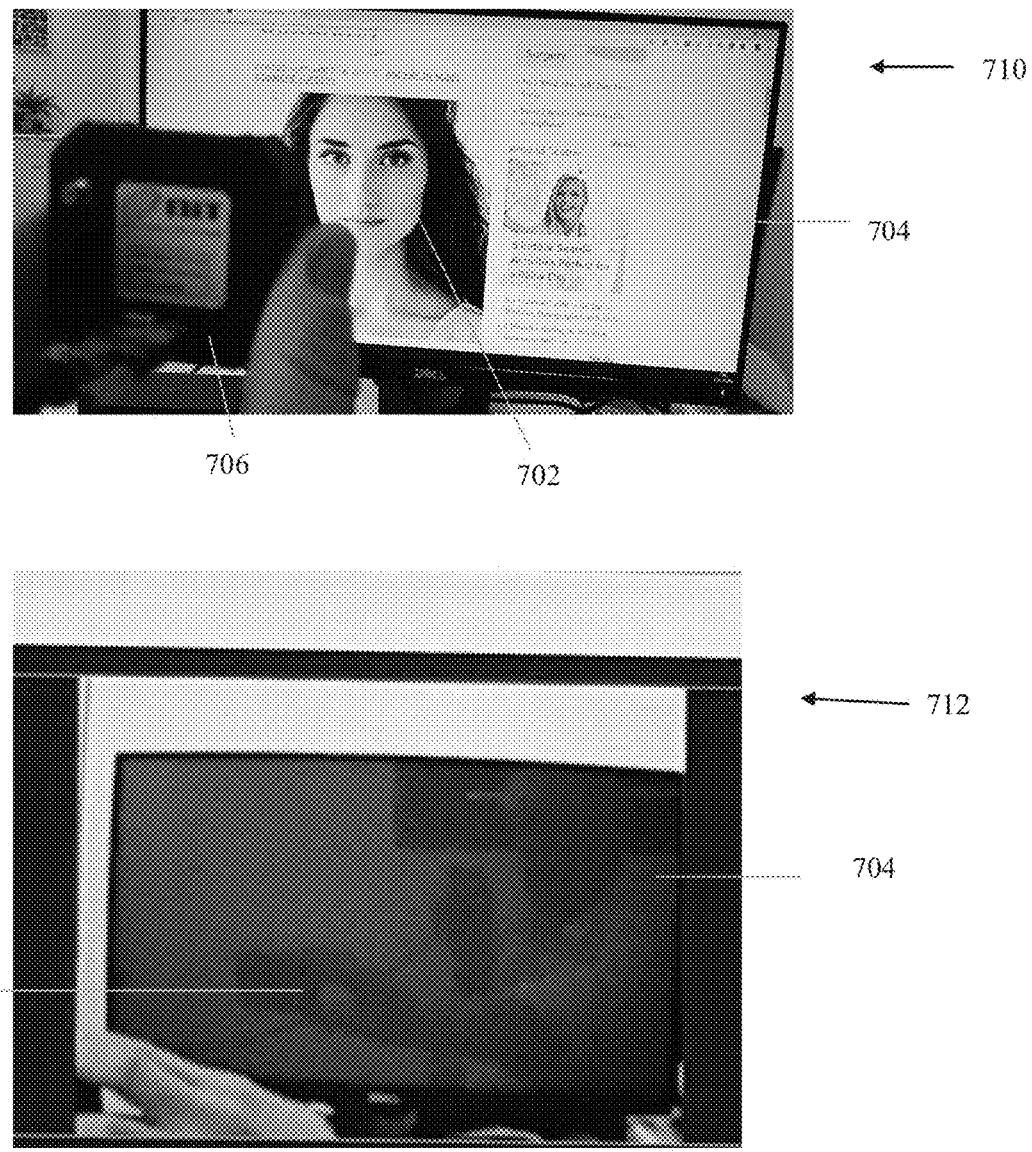
FIG. 7 is an image of a face of a person presented on a display captured by a visual light sensor compared to being captured by a SWIR sensor, in accordance with some embodiments of the present invention.

Reference is now made to FIG. 7, which compares an image of a face of a person 702 presented on a display 704 captured by a visual light sensor 706 to being captured by a SWIR sensor 708, in accordance with some embodiments of the present invention. Schematic 710 presents a view of visual light sensor 706 capturing a visual light image of face 702 presented on display 704. Such a scenario may occur, for example, when a malicious attacker is attempting to gain access and/or be validated by presenting an image on a display of a person who is known to be granted the access and/or is validated. The image of the face is presented to a visual light sensor in an attempt to trick the sensor into recognizing the image of the face, in place of the real person. Schematic 712 presents a view of display 704 captured using SWIR wavelengths. Display 704 acts as a mirror in SWIR wavelengths, reflecting the image of SWIR sensor 708. The image of the face presented on display 704 is not captured in the SWIR wavelengths, and does not appear in the SWIR image of display 704.

Figure 8:
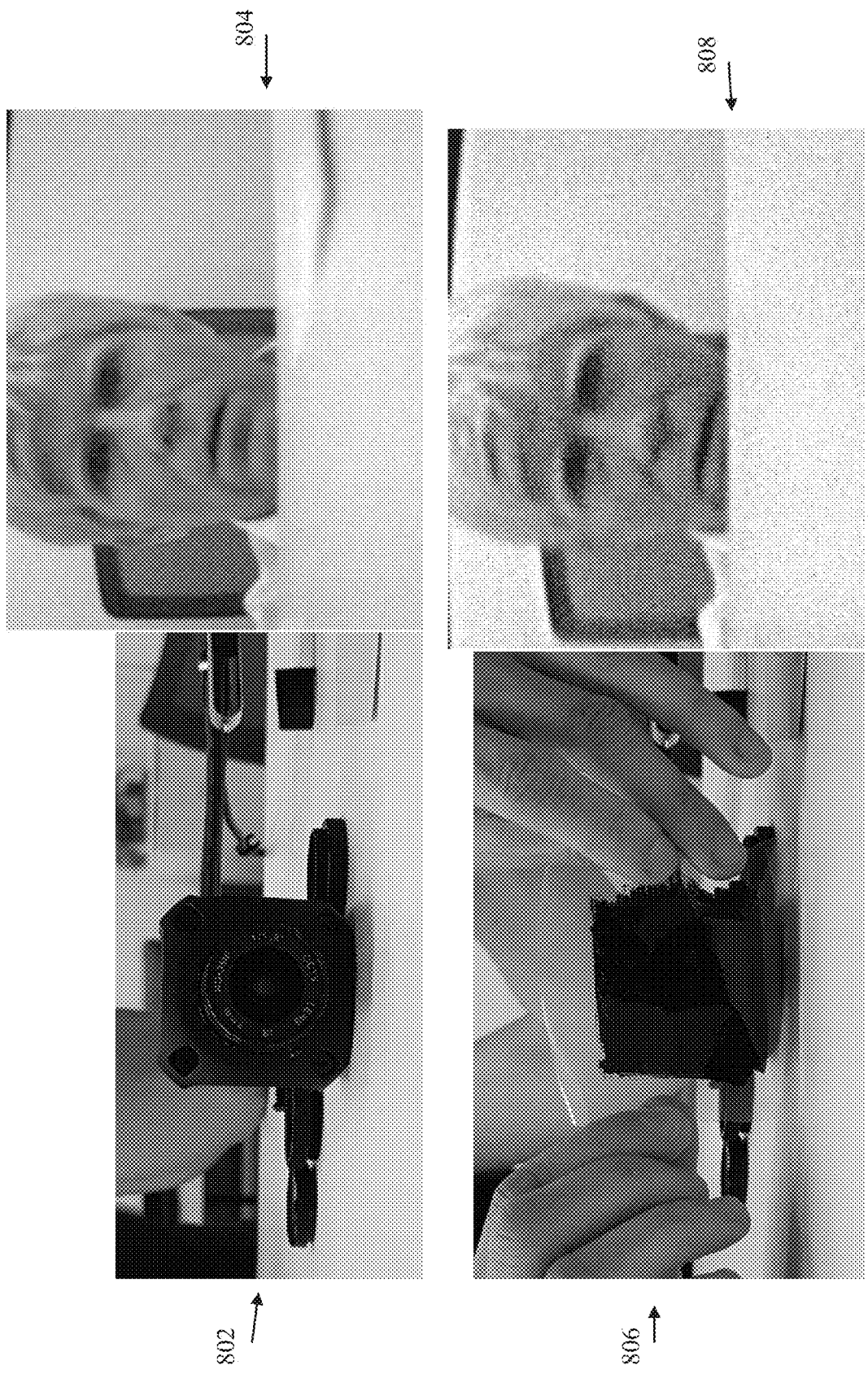
FIG. 8 is a schematic depicting an SWIR camera 802 and corresponding captured SWIR image 804, and another schematic depicting the SWIR camera obstructed by a barrier and corresponding captured SWIR image, in accordance with some embodiments of the present invention.

Reference is now made to FIG. 8, which is a schematic depicting an SWIR camera 802 (unobstructed by a barrier) and corresponding captured SWIR image 804, and another schematic depicting the SWIR camera obstructed by a barrier 806 and corresponding captured SWIR image 808, in accordance with some embodiments of the present invention. Even when image 808 is of lower quality than image 804 (e.g., lower signal to noise) due to the presence of the barrier, the quality of image 808 is sufficiently high to manually and/or automatically discern facial features for manual and/or automatic detection of the identity of the person depicted in the image.

Reference is now made to FIG. 9, which is a schematic depicting a setup including a mirror 952 on which is overlaid a barrier 950 of 9C20 by Plexiglas®, and an SWIR camera 904 pointed towards barrier 905 and mirror 952 for capturing SWIR images reflected off mirror 952 behind barrier 905, in accordance with some embodiments of the present invention. Image 960, which is captured by a standard visual light camera, depicts the setup as seen in the visual light range. Barrier 950 is seen as black in image 960. No reflection off mirror 952 can be seen in image 960. Image 962 is the SWIR image of barrier 950 and mirror 952 as captured by SWIR camera 904. SWIR image 962 depicts a reflection of a person 964 as reflected by mirror 952 located behind barrier 950. The quality of image 962 is sufficiently high to accurately identify the identity of person 964, by automated and/or manual processes.

Although the present invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. An apparatus for discreet imaging of a scene, comprising:
    at least one short wave infrared (SWIR) sensor that captures at least one SWIR image of the scene at a SWIR wavelength range;
    at least one SWIR illumination element that generates SWIR illumination at the SWIR wavelength range; and
    a barrier positioned such that SWIR illumination reflecting off objects of scene within the field of view passes through the barrier to reach the at least one SWIR sensor, the barrier made out of a material and having a thickness selected for being opaque to visible light and non-opaque to the SWIR wavelength range;
    wherein the barrier is positioned in proximity to a reflective surface of a mirror that reflects the SWIR illumination;
    wherein the barrier is selected from the group consisting of: paint applied to reflective surface, infrared dye applied to the reflective surface, and plastic positioned on or in proximity to the reflective surface;
    barrier is made out of a material and/or has a thickness selected for being at least opaque to visible light and non-opaque to the SWIR wavelength range.

2. The apparatus of claim 1, wherein the barrier is positioned within an entire field of view of the at least one SWIR sensor.

3. The apparatus of claim 1, further comprising code instructions stored on a memory that when executed by at least one hardware processor cause the hardware processor to analyze the at least one SWIR image to identify faces of people depicted in the SWIR image as a reflection off a display, and output an identity of a face of a person depicted in the at least one SWIR image according to the analysis.

4. An apparatus for discreet imaging of a scene, comprising:
- at least one short wave infrared (SWIR) sensor that captures at least one SWIR image of the scene at a SWIR wavelength range;
- at least one SWIR illumination element that generates SWIR illumination at the SWIR wavelength range; and
- a barrier positioned such that SWIR illumination reflecting off objects of scene within the field of view passes through the barrier to reach the at least one SWIR sensor, the barrier made out of a material and having a thickness selected for being opaque to visible light and non-opaque to the SWIR wavelength range;
- further comprising code instructions stored on a memory that when executed by at least one hardware processor cause the hardware processor to analyze the at least one SWIR image to detect an indication of a mask, and provide the indication of the mask.

5. The apparatus of claim 4, wherein the analysis to detect an indication of the mask comprising detecting a statistical similarity in pixel intensity values between the at least one SWIR image at about 1000 nm and at about 1500-1550 nm.

6. An apparatus for discreet imaging of a scene, comprising:
- at least one short wave infrared (SWIR) sensor that captures at least one SWIR image of the scene at a SWIR wavelength range;
- at least one SWIR illumination element that generates SWIR illumination at the SWIR wavelength range; and
- a barrier positioned such that SWIR illumination reflecting off objects of scene within the field of view passes through the barrier to reach the at least one SWIR sensor, the barrier made out of a material and having a thickness selected for being opaque to visible light and non-opaque to the SWIR wavelength range;
- wherein the at least one SWIR sensor captures the at least one SWIR image at a quality level above a threshold and a visible light sensor substituted for the at least one SWIR sensor captures at least one visible light image using visible light at a quality level below the threshold.

7. The apparatus of claim 6, wherein the quality level denotes at least one member of the group consisting of: a signal to noise ratio, and an accuracy of automatically identifying a feature depicted in the at least one SWIR image, the feature selected from the group consisting of: a face, a person, a pose, a gesture, and a measurement of a body of a person.

8. An apparatus for discreet imaging of a scene, comprising:
- at least one short wave infrared (SWIR) sensor that captures at least one SWIR image of the scene at a SWIR wavelength range;
- at least one SWIR illumination element that generates SWIR illumination at the SWIR wavelength range; and
- a barrier positioned such that SWIR illumination reflecting off objects of scene within the field of view passes through the barrier to reach the at least one SWIR sensor, the barrier made out of a material and having a thickness selected for being opaque to visible light and non-opaque to the SWIR wavelength range;
- wherein the at least one SWIR sensor captures the at least one SWIR image at a quality level below a threshold, and a visible light sensor positioned to capture at least one visible light image using visible light prior to passing through the barrier captures the at least one visible light images at a quality level above the threshold.

9. The apparatus of claim 8, wherein the material and thickness of the barrier are selected such that the quality level of the at least one SWIR image captured by the SWIR sensor is within a tolerance range of the quality level of the at least one visible light image captured by the visible light sensor using visible light non-passing through the barrier.

10. The apparatus of claim 9, wherein the tolerance range denotes a statistical similar accuracy in correct identification of a feature depicted in the at least SWIR image captured by the SWIR sensor and the at least one visible light image captured by the visible light sensor, the feature selected from the group consisting of: a face, a person, a pose, a gesture, and a measurement of a body of a person.

11. An apparatus for discreet imaging of a scene, comprising:
- at least one short wave infrared (SWIR) sensor that captures at least one SWIR image of the scene at a SWIR wavelength range;
- at least one SWIR illumination element that generates SWIR illumination at the SWIR wavelength range;
- a barrier positioned such that SWIR illumination reflecting off objects of scene within the field of view passes through the barrier to reach the at least one SWIR sensor, the barrier made out of a material and having a thickness selected for being opaque to visible light and non-opaque to the SWIR wavelength range; and
- at least one hardware processor for executing a code stored on a memory, the code for receiving the at least one SWIR image, and analyzing the at least one SWIR image to recognize at least one feature depicted within the respective SWIR image, the feature selected from the group consisting of: a face, a person, a pose, a gesture, and a measurement of a body of a person.

12. The apparatus of claim 11, wherein when the at least one hardware processor executing a code fails to recognize the at least one feature depicting within at least one visible light image captured by the visible light sensor substituted for the at least one SWIR sensor, the feature selected from the group consisting of: a face, a person, a pose, a gesture, and a measurement of a body of a person.

13. An apparatus for discreet imaging of a scene, comprising:
- at least one short wave infrared (SWIR) sensor that captures at least one SWIR image of the scene at a SWIR wavelength range;
- at least one SWIR illumination element that generates SWIR illumination at the SWIR wavelength range;
- a barrier positioned such that SWIR illumination reflecting off objects of scene within the field of view passes through the barrier to reach the at least one SWIR sensor, the barrier made out of a material and having a thickness selected for being opaque to visible light and non-opaque to the SWIR wavelength range;
- wherein the at least one SWIR illumination element is positioned behind the barrier such that the SWIR illumination generated by the SWIR illumination element passes through the barrier before reflection of the objects.

14. An apparatus for discreet imaging of a scene, comprising:

at least one short wave infrared (SWIR) sensor that captures at least one SWIR image of the scene at a SWIR wavelength range;

at least one SWIR illumination element that generates SWIR illumination at the SWIR wavelength range;

a barrier positioned such that SWIR illumination reflecting off objects of scene within the field of view passes through the barrier to reach the at least one SWIR sensor, the barrier made out of a material and having a thickness selected for being opaque to visible light and non-opaque to the SWIR wavelength range;

wherein the field of view depicted within the at least one SWIR image is wider than a field of view of a visible light image captured by the visible light sensor through a pinhole.

15. An apparatus for discreet imaging of a scene, comprising:

at least one short wave infrared (SWIR) sensor that captures at least one SWIR image of the scene at a SWIR wavelength range;

at least one SWIR illumination element that generates SWIR illumination at the SWIR wavelength range;

a barrier positioned such that SWIR illumination reflecting off objects of scene within the field of view passes through the barrier to reach the at least one SWIR sensor, the barrier made out of a material and having a thickness selected for being opaque to visible light and non-opaque to the SWIR wavelength range;

wherein the at least one SWIR sensor, the at least one SWIR illumination element, and the barrier are stored within a household item, the barrier formed as a continuation of an outer shell of the household item, and the at least one SWIR sensor and the at least one SWIR illumination element stored within an interior of the household item behind the barrier.

16. An apparatus for discreet imaging of a scene, comprising:

at least one short wave infrared (SWIR) sensor that captures at least one SWIR image of the scene at a SWIR wavelength range;

at least one SWIR illumination element that generates SWIR illumination at the SWIR wavelength range;

a barrier positioned such that SWIR illumination reflecting off objects of scene within the field of view passes through the barrier to reach the at least one SWIR sensor, the barrier made out of a material and having a thickness selected for being opaque to visible light and non-opaque to the SWIR wavelength range; and wherein the SWIR illumination comprises a predefined SWIR pattern, and further comprising at least one hardware processor for executing a code stored on a memory, the code for receiving the at least one SWIR image including the predefined SWIR pattern, and analyzing the predefined SWIR pattern for a structured light application.

17. An apparatus for discreet imaging of a scene, comprising:

at least one short wave infrared (SWIR) sensor that captures at least one SWIR image of the scene at a SWIR wavelength range;

at least one SWIR illumination element that generates SWIR illumination at the SWIR wavelength range;

a barrier positioned such that SWIR illumination reflecting off objects of scene within the field of view passes through the barrier to reach the at least one SWIR sensor, the barrier made out of a material and having a thickness selected for being opaque to visible light and non-opaque to the SWIR wavelength range; and at least one hardware processor for executing a code stored on a memory, the code for receiving the at least one SWIR image, analyzing the at least one SWIR image to detect a reflective surface, the reflecting surface denoting a digital display, and generating an alert indicative of attempted malicious activity using a digital display presenting a digital image for authentication.

* * * * *